(12) United States Patent
Zubin et al.

(10) Patent No.: US 11,059,106 B2
(45) Date of Patent: *Jul. 13, 2021

(54) SYSTEMS AND METHODS FOR FORMING PERFORATIONS IN A BARREL STRUCTURE

(71) Applicant: The Boeing Company, Chicago, IL (US)

(72) Inventors: Claudio Zubin, Winnipeg (CA);
Geoffrey Gibbings, Winnipeg (CA);
Mathew J. Shewfelt, Winnipeg (CA);
Damjan Simonovic, Winnipeg (CA);
Antonio M. Ferreira, Petersfield (CA);
David Boonstra, Dugald (CA); Arnold J. Lauder, Winnipeg (CA); Mark F. Gabriel, Renton, WA (US)

(73) Assignee: The Boeing Company, Chicago, IL (US)

( * ) Notice: Subject to any disclaimer, the term of this patent is extended or adjusted under 35 U.S.C. 154(b) by 490 days.

This patent is subject to a terminal disclaimer.

(21) Appl. No.: 15/871,958

(22) Filed: Jan. 15, 2018

(65) Prior Publication Data

US 2018/0154455 A1    Jun. 7, 2018

Related U.S. Application Data

(60) Continuation of application No. 15/155,018, filed on May 15, 2016, now Pat. No. 9,884,370, which is a
(Continued)

(51) Int. Cl.
*B23B 39/14* (2006.01)
*B23B 39/24* (2006.01)
(Continued)

(52) U.S. Cl.
CPC .............. *B23B 39/24* (2013.01); *B23B 39/14* (2013.01); *B23B 39/20* (2013.01); *B25J 11/005* (2013.01);
(Continued)

(58) Field of Classification Search
CPC ................................ B23B 39/14; B23B 39/24
See application file for complete search history.

(56) References Cited

U.S. PATENT DOCUMENTS 4,898,501 A    2/1990 Palmer
8,220,588 B2    7/2012 Thrash et al.
(Continued)

FOREIGN PATENT DOCUMENTS

EP    0383652    8/1990
FR    2927271    8/2009
(Continued)

OTHER PUBLICATIONS

JPO, Japanese Office Action for 2014-166466, dated Jun. 26, 2018.
(Continued)

*Primary Examiner* — James Sanders

(57) ABSTRACT

A drilling system includes a single robotic drilling unit having a drill end effector positioned inside a barrel section configured as a composite sandwich structure having an inner face sheet. The robotic drilling unit is operable to drill a plurality of perforations into the inner face sheet using the drill end effector. The robotic drilling unit is configured to index a hole pattern of the perforations to one or more cell walls of a honeycomb core of the composite sandwich structure. The robotic drilling unit is configured to form the hole pattern in the inner face sheet such that the perforations are located at a spaced distance from the cell walls of the honeycomb core.

30 Claims, 12 Drawing Sheets

Related U.S. Application Data division of application No. 14/012,243, filed on Aug. 28, 2013, now Pat. No. 9,370,827.

(51) Int. Cl.
| | |
|---|---|
| *B23B 39/20* | (2006.01) |
| *B25J 11/00* | (2006.01) |
| *B64D 33/02* | (2006.01) |
| *F02C 7/045* | (2006.01) |

(52) U.S. Cl.
CPC .............. *B64D 33/02* (2013.01); *F02C 7/045* (2013.01); *B23B 2215/04* (2013.01); *B23B 2226/27* (2013.01); *B23B 2270/16* (2013.01); *B23B 2270/20* (2013.01); *B23B 2270/32* (2013.01); *B64D 2033/0206* (2013.01); *B64D 2033/0286* (2013.01); *Y10T 408/03* (2015.01); *Y10T 408/38* (2015.01)

(56) References Cited

U.S. PATENT DOCUMENTS

| | | | |
|---|---|---|---|
| 2009/0037022 A1* | 2/2009 | Teaford | B25J 9/1641 |
| | | | 700/254 |
| 2009/0313830 A1 | 12/2009 | Bisiach | |
| 2010/0217437 A1 | 8/2010 | Sahr | |
| 2013/0075193 A1 | 3/2013 | LaValle | |

FOREIGN PATENT DOCUMENTS

| | | |
|---|---|---|
| GB | 2478312 | 9/2011 |
| JP | 2007-309644 | 11/2007 |
| JP | 2010-194710 | 9/2010 |
| JP | 2013-522511 | 6/2013 |
| WO | WO20080035723 | 3/2008 |
| WO | WO2011107733 | 9/2011 |

OTHER PUBLICATIONS

European Search Report for EP14182038.1, dated Jan. 29, 2015.
Canadian IP Office, Canadian Office Action for Application No. 2,857,827, dated Aug. 12, 2015.
Chinese Office Action for 201410420922.8, dated Aug. 30, 2017.
European Search Report for EP14182038.1, dated Jun. 26, 2017.
JPO, Japanese Office Action for 2014-166466, dated Feb. 26, 2019.
Korean Patent Office, Korean Office Action for Appl. No. 10-2014-0096322, dated Jun. 12, 2020.
JPO, Japanese Office Action for 2014-166466, dated Feb. 25, 2020.

* cited by examiner

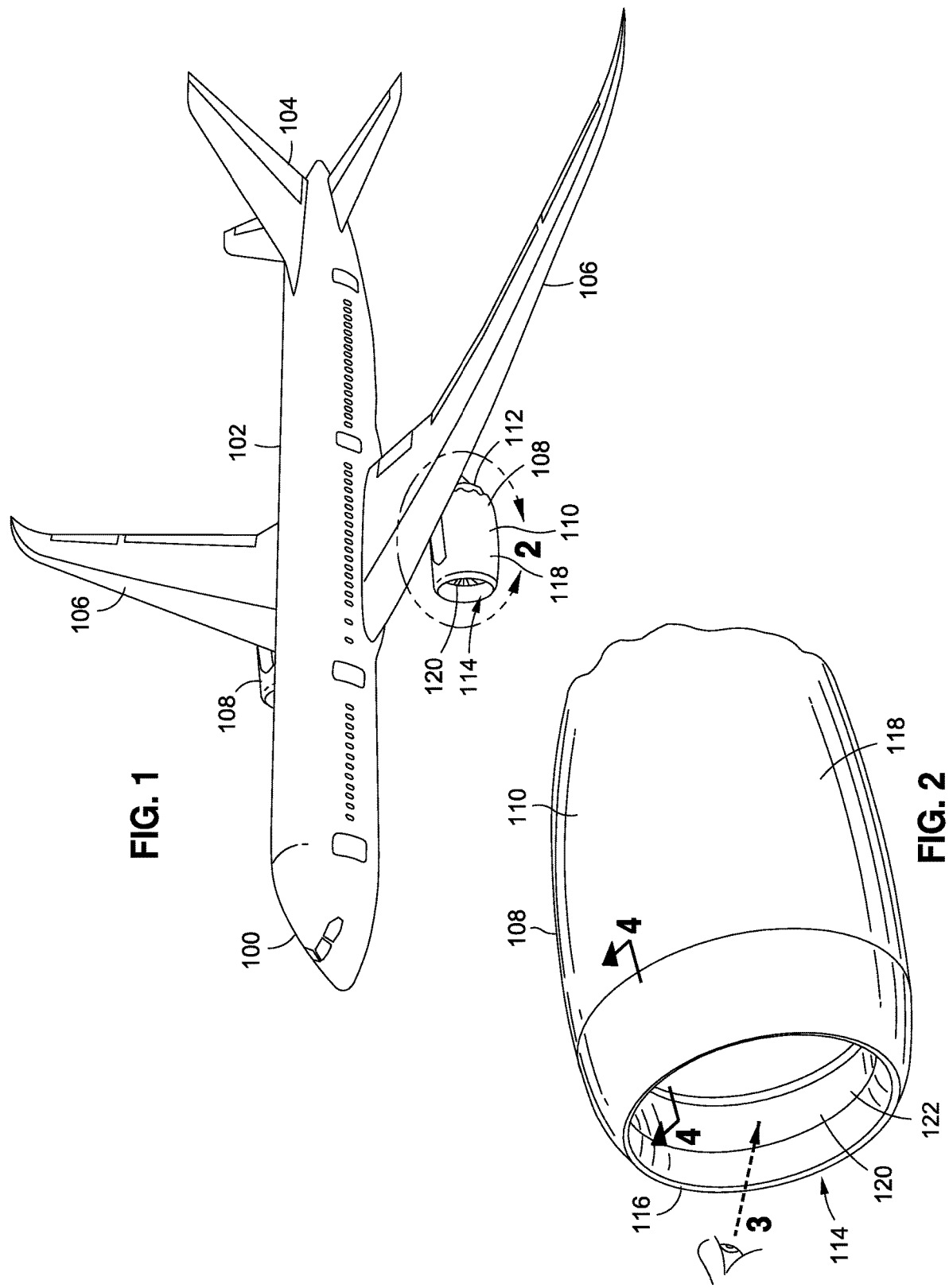

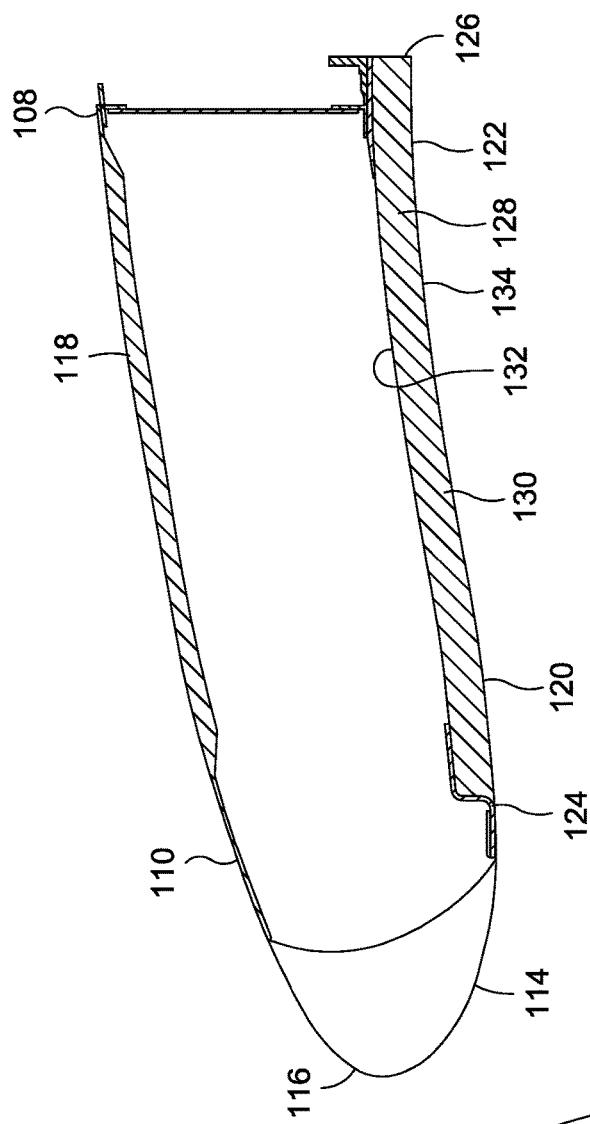
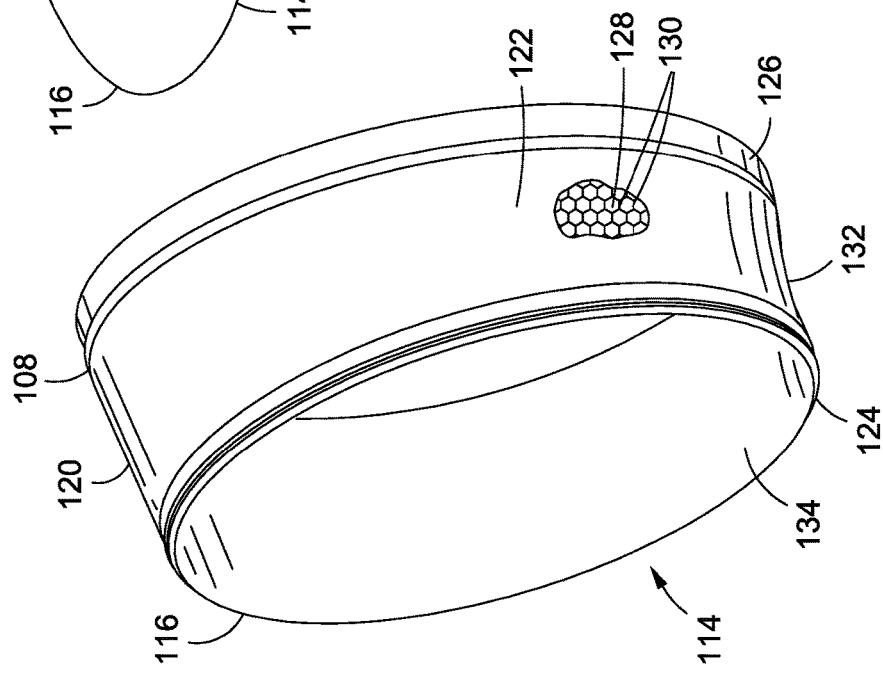

SYSTEMS AND METHODS FOR FORMING PERFORATIONS IN A BARREL STRUCTURE

CROSS-REFERENCE TO RELATED APPLICATIONS

The present application is a continuation application of and claims priority to pending U.S. application Ser. No. 15/155,018 filed on May 15, 2016, and entitled SYSTEM FOR FORMING PERFORATIONS IN A BARREL SECTION, which is a divisional application of and claims priority to U.S. application Ser. No. 14/012,243 filed on Aug. 28, 2013, now U.S. Pat. No. 9,370,827, issued on Jun. 21, 2016, and entitled SYSTEM AND METHOD FOR FORMING PERFORATIONS IN A BARREL SECTION, the entire contents of which is expressly incorporated by reference herein.

FIELD

The present disclosure relates generally to production of acoustic treatment of structures and, more particularly, to the forming of acoustic perforations in an engine inlet barrel section.

BACKGROUND

Commercial airliners are required to meet certain noise standards such as during takeoff and landing. A large portion of the noise produced by a commercial airliner during takeoff and landing is generated by gas turbine engines commonly used on airliners. Known methods for reducing the noise level of a gas turbine engine include acoustically treating the engine inlet of the engine nacelle. In this regard, the inner barrel section of a gas turbine engine inlet may be provided with a plurality of relatively small perforations formed in the walls of the inner barrel section. The perforations absorb some of the noise that is generated by fan blades rotating at high speed at the engine inlet, and thereby reduce the overall noise output of the gas turbine engine.

Conventional methods for forming perforations in acoustic structures such as the barrel section include forming the inner wall of the barrel section as a separate component, followed by forming the perforations in the inner wall. The inner wall may then be assembled with other components that make up the barrel section, which is then assembled with the nacelle of the gas turbine engine. Unfortunately, such conventional methods for forming acoustic structures include operations that may result in the blockage of some of the perforations after the perforations have been formed.

Conventional methods for forming acoustic structures may also result in missing perforations. Such blocked perforations or missing perforations may reduce the percent-open-area (POA) of the inner wall (e.g., the total area of the perforations as a percentage of the surface area of the inner wall) which is a characteristic of acoustic structures for measuring their overall effectiveness in absorbing or attenuating noise. Furthermore, conventional methods of forming perforations in acoustic structures are time-consuming processes that add to the production schedule and cost.

As can be seen, there exists a need in the art for a system and method for forming perforations in an acoustic structure which minimizes or eliminates the occurrence of blocked or missing perforations, and which may be performed in a timely and cost-effective manner.

SUMMARY

The above-noted needs associated with forming perforations in an acoustic structure such as an engine inlet are specifically addressed and alleviated by the present disclosure which provides a drilling system that may include a plurality of robotic drilling units. Each one of the robotic drilling units may include a drill end effector positioned inside a barrel section of an engine inlet. The barrel section may be configured as a composite sandwich structure having an inner face sheet. The robotic drilling units may be operable in synchronized movement with one another to drill a plurality of perforations into the inner face sheet using the drill end effectors in a manner providing a predetermined percent-open-area of the inner face sheet.

Also disclosed is a method of fabricating an engine inlet. The method may include providing an engine inlet inner barrel section configured as a composite sandwich structure having an inner face sheet, a core, and an outer face sheet. The method may further include robotically drilling a plurality of perforations in the inner face sheet after final cure of the composite sandwich structure. The method may additionally include forming the plurality of perforations in a quantity providing a predetermined percent-open-area of the inner face sheet.

In a further embodiment, disclosed is a method of fabricating an engine inlet including the step of providing an engine inlet inner barrel section configured as a one-piece composite sandwich structure having an inner face sheet, an outer face sheet, and a honeycomb core. The composite sandwich structure may be formed in a single stage cure wherein the inner face sheet, the core, and the outer face sheet may be co-cured and/or co-bonded in a single operation. The method may include drilling, using a plurality of robotic drilling units, a plurality of perforations in the inner face sheet after final cure of the composite sandwich structure. The method may further include operating the plurality of robotic drilling units in synchronized movement with one another to simultaneously drill the plurality of perforations. The method may also include forming the plurality of perforations in a quantity providing a predetermined percent-open-area of the inner face sheet.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numbers refer to like parts throughout and wherein:

FIG. 1 is a perspective illustration of an aircraft;

FIG. 2 is a perspective illustration of a nacelle of a gas turbine engine of the aircraft of FIG. 1;

FIG. 3 is a perspective illustration of an inner barrel section of an engine inlet of the gas turbine engine of FIG. 2;

FIG. 4 is a cross-sectional illustration of a leading edge of the engine inlet of the gas turbine engine of FIG. 2;

DETAILED DESCRIPTION

Figure 5:
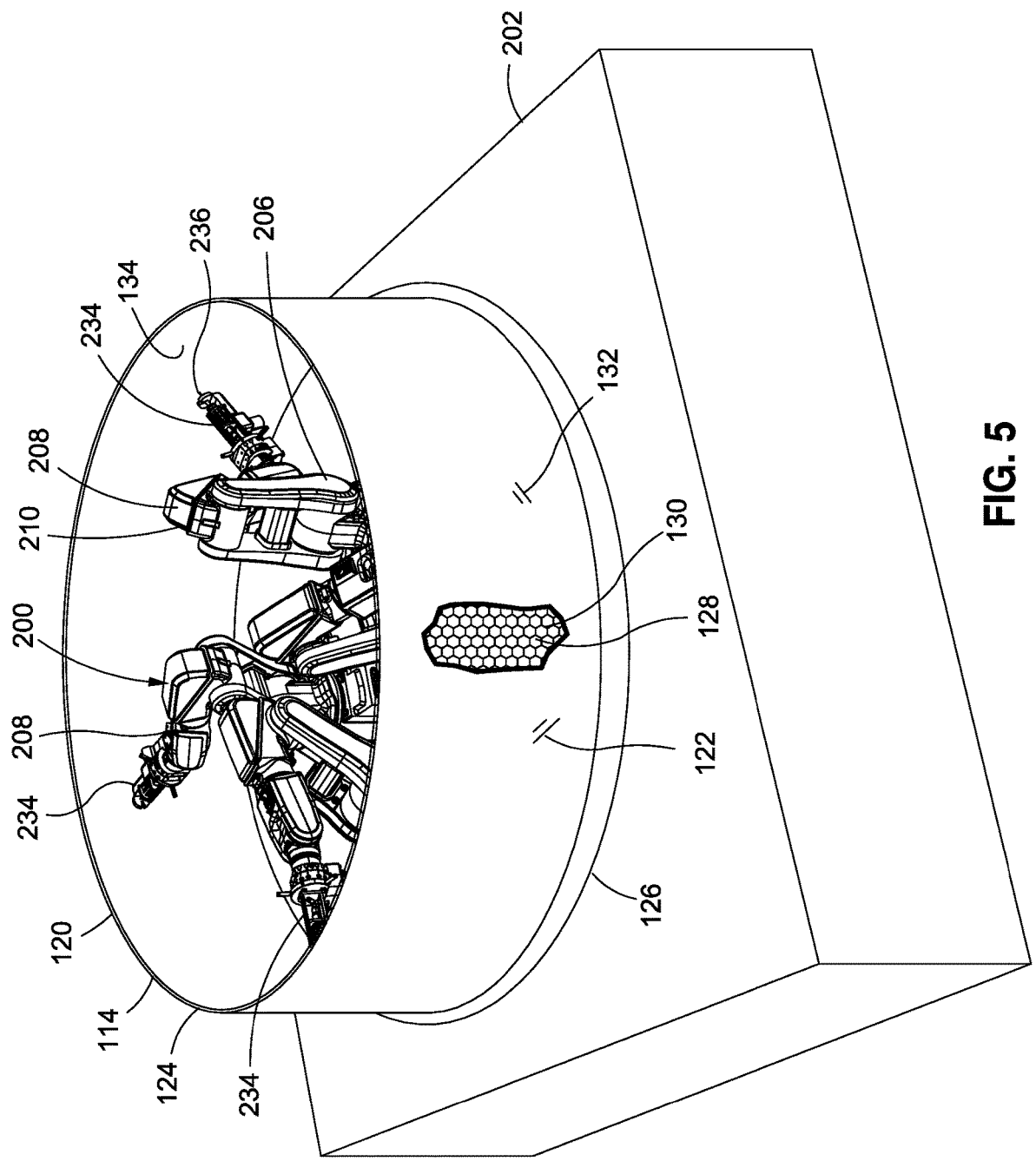
FIG. 5 is a perspective illustration of an embodiment of a drilling system for forming perforations in a barrel section.

Referring now to the drawings wherein the showings are for purposes of illustrating various embodiments of the present disclosure, shown in FIG. 1 is a perspective illustration of an aircraft 100. The aircraft 100 may include a fuselage 102 extending from a nose to an empennage 104. The empennage 104 may include one or more tail surfaces for directional control of the aircraft 100. The aircraft 100 may include a pair of wings 106 extending outwardly from the fuselage 102.

In FIG. 1, the aircraft 100 may include one or more propulsion units which, in an embodiment, may be supported by the wings 106. Each one of the propulsion units may be configured as a gas turbine engine 108 having a core engine (not shown) surrounded by a nacelle 110. The nacelle 110 may include an engine inlet 114 and a fan cowl 118 surrounding one or more fans (not shown) mounted on a forward end (not shown) of the core engine. The nacelle 110 may have an exhaust nozzle 112 (e.g., a primary exhaust nozzle and a fan nozzle) at an aft end (not shown) of the gas turbine engine 108.

FIG. 2 illustrates an embodiment of a gas turbine engine 108 having an engine inlet 114. The engine inlet 114 may include a leading edge 116 and an inner barrel section 120 located aft of the leading edge 116 of the engine inlet 114. The inner barrel section 120 may provide a boundary surface or wall for directing airflow (not shown) entering the engine inlet 114 and passing through the gas turbine engine 108. The inner barrel section 120 may be located in relatively close proximity to one or more fans (not shown). In this regard, the inner barrel section 120 may also be configured to serve as an acoustic structure having a plurality of perforations 136 (FIG. 9) in an inner face sheet 134 (FIG. 10) of the inner barrel section 120 for absorbing noise generated by the rotating fans and/or noise generated by the airflow entering the engine inlet 114 and passing through the gas turbine engine 108.

As described below, the total area of the perforations 136 in the inner face sheet 134 may be expressed as percent-open-area 144 (FIG. 9) which represents the total area of the perforations 136 as a percentage of the surface area of the inner face sheet 134. The percent-open-area 144 may be a characteristic for measuring the overall effectiveness or acoustic-attenuating capability of the inner barrel section 120. During the design and/or development of the aircraft 100, a specific, a predetermined percent-open-area 144 (FIG. 9) may be selected for the inner barrel section 120 to meet acoustic performance requirements of the engine inlet 114.

FIG. 3 is a perspective illustration of an embodiment of an inner barrel section 120 of an engine inlet 114. In the embodiment shown, the barrel section 120 may have a diameter (not shown) of up to 5-8 feet or larger, and a length (not shown) extending from an aft edge 126 to a forward edge 124 of up to 2-3 feet or longer. However, the barrel section 120 may be provided in any size, shape, and configuration, without limitation. The inner barrel section 120 may be formed as a composite sandwich structure 122 having an inner face sheet 134 and an outer face sheet 132 separated by a core 128. The inner face sheet 134 and/or the outer face sheet 132 may be formed of composite material including fiber-reinforced polymeric matrix material such as graphite-epoxy, fiberglass-epoxy, or other composite material. Alternatively, the inner face sheet 134 and/or the outer face sheet 132 may be formed of metallic material such as titanium, steel, or other metallic materials or combinations of materials. The core 128 may comprise honeycomb core having a plurality of cells 130 oriented generally transverse to the inner face sheet 134 and outer face sheet 132. The core 128 may be formed of metallic material and/or non-metallic material and may include aluminum, titanium, aramid, fiberglass, or other core materials.

In FIG. 3, in an embodiment, the engine inlet 114 may comprise a one-piece engine inlet 114 inner barrel section 120. The inner barrel section 120 may be fabricated from raw materials (not shown) and assembled and cured in one or more stages. For example, the inner face sheet 134 and the outer face sheet 132 may be separately formed by laying up dry fiber fabric (not shown) or resin-impregnated ply material (i.e., pre-preg) on separate layup mandrels (not shown) and separately cured, followed by bonding the inner face sheet 134 and the outer face sheet 132 to the core 128. Alternatively, the inner barrel section 120 may be fabricated in a single-stage cure process wherein the inner face sheet 134 may be laid up on a layup mandrel (not shown), after which the core 128 may be laid up over the inner face sheet 134, followed by laying up the outer face sheet 132 over the core 128. The layup assembly (not shown) may be cured in a single stage, after which the drilling system 200 (FIG. 5) disclosed herein may be implemented for forming perforations 136 (FIG. 9) in the inner face sheet 134.

In an embodiment described in greater detail below, the drilling system 200 (FIG. 5) disclosed herein may be implemented for forming a plurality of perforations 136 (FIG. 9) in the inner face sheet 134 (FIG. 9) of the assembled barrel section 120. For example, the drilling system 200 (FIG. 5) disclosed herein may include a plurality of robotic drilling units 208 (FIG. 8) positioned inside the barrel section 120 for robotically drilling a plurality of the perforations 136 in the inner face sheet 134 after final cure of the composite sandwich structure 122 engine inlet inner barrel section 120. The perforations 136 (FIG. 9) may be formed in a size and quantity to provide a predetermined percent-open-area 144 for the inner barrel section 120 to allow the inner barrel section 120 to meet acoustic performance requirements of the engine inlet 114.

In FIG. 3, the inner barrel section 120 may comprise a unitary structure having closed shape with a generally cylindrical configuration. However, in an embodiment, the inner barrel section 120 may be formed as multiple segments (not shown) assembled together to form a closed shape. The inner barrel section 120 may be provided in a contoured cross-sectional shape (not shown) to promote airflow (not shown) through the gas turbine engine 108. In this regard, when viewed along a circumferential direction, the inner barrel section 120 may have a cross section that may be complexly curved and may be formed complementary to the shape of the engine inlet 114 leading edge 116 at a forward edge 124 of the inner barrel section 120, and complementary to the shape of the interior nacelle surfaces (not shown) aft of the inner barrel section 120. However, the inner barrel section 120 may be provided in any shape including a simple cylindrical shape and/or a conical shape.

FIG. 4 is a cross-sectional illustration of the leading edge 116 of the engine inlet 114 showing the composite sandwich construction including the circumferential inner face sheet 134, the circumferential outer face sheet 132, and the core 128 separating the inner face sheet 134 and outer face sheet 132 of the barrel section 120. The forward edge 124 of the inner barrel section 120 may be coupled to or may interface with the engine inlet 114 leading edge 116. The aft edge 126 of the inner barrel section 120 may be coupled to or may interface with the nacelle interior (not shown). In the embodiment shown, the inner face sheet 134, the core 128, and the outer face sheet 132 have a complexly-curved cross sectional shape to promote efficient airflow through the nacelle 110.

FIG. 5 is an illustration of an embodiment of a drilling system 200 as may be implemented for forming perforations 136 (FIG. 9) in a barrel section 120 such as the inner barrel section 120 of an engine inlet 114 of a gas turbine engine 108 (FIG. 3). However, the drilling system 200 disclosed herein may be implemented for forming perforations 136 (FIG. 9) in any type of barrel structure for any application, without limitation. For example, the drilling system 200 may be implemented for forming perforations 136 (FIG. 9) in a barrel section of any one of a variety of different types of commercial, civilian, and military aircraft 100 (FIG. 1). Furthermore, the drilling system 200 may be implemented for forming perforations 136 (FIG. 9) in the barrel section 120 of a gas turbine engine 108 (FIG. 1) of rotorcraft, hovercraft, or in any other vehicular or non-vehicular application wherein a predetermined quantity of acoustic perforations 136 (FIG. 9) are required in a barrel section 120 for acoustic attenuating purposes.

In FIG. 5, the drilling system 200 is shown mounted within an interior of a barrel section 120. The drilling system 200 may include robotic drilling units 208 that advantageously allow for forming perforations 136 (FIG. 9) in a barrel section 120 to provide the predetermined percent-open-area 144 (FIG. 9) of the inner face sheet 134 of the barrel section 120. As indicated above, the predetermined percent-open-area 144 may be determined during the design and/or development of the aircraft 100 (FIG. 1) to meet acoustic performance requirements of the engine inlet 114. The drilling system 200 disclosed herein advantageously allows for consistently forming perforations 136 in the inner face sheets 134 of composite sandwich structure 122 barrel sections 120 to provide a predetermined percent-open-area 144 (FIG. 9) in the inner face sheet 134. In this regard, the drilling system 200 advantageously overcomes the drawbacks associated with conventional methods for forming perforations (not shown) in conventional inner barrel sections (not shown) such as the above-mentioned drawbacks associated with blocked perforations (not shown) due to subsequent processing of a conventional inner barrel section (not shown) in a conventional multi-stage forming process (not shown), and/or due to missing perforations (not shown) during conventional perforating (not shown) of the inner skin (not shown) of a conventional inner barrel section. Such blocked perforations or missing perforations may reduce the predetermined percent-open-area 144 of the inner skin of the conventional inner barrel section which may reduce the acoustic performance of the engine inlet 114.

In FIG. 5, a plurality of robotic drilling units 208 (e.g., two robotic drilling units 208, three robotic drilling units 208, etc.) may be supported on a system base 202. Each one of the robotic drilling units 208 may include a drill end effector 234. In an embodiment, the system base 202 may comprise a relatively rigid structure and may include a tooling fixture, a shop floor, or a table configured to support the plurality of robotic drilling units 208. In addition, the system base 202 may be configured to support the barrel section 120. However, the drilling system 200 may be provided in an alternative embodiment wherein the plurality of robotic drilling units 208 are supported by a structure that is located separate from the barrel section 120. For example, the plurality of robotic drilling units 208 may be suspended over the inner barrel section 120 such as by an overhead fixture (not shown) in a manner such that the drill end effectors 234 may be positioned within the interior of the barrel section 120, and/or the plurality of robotic drilling units 208 may be mounted inside or outside of the barrel section 120.

Figure 6:
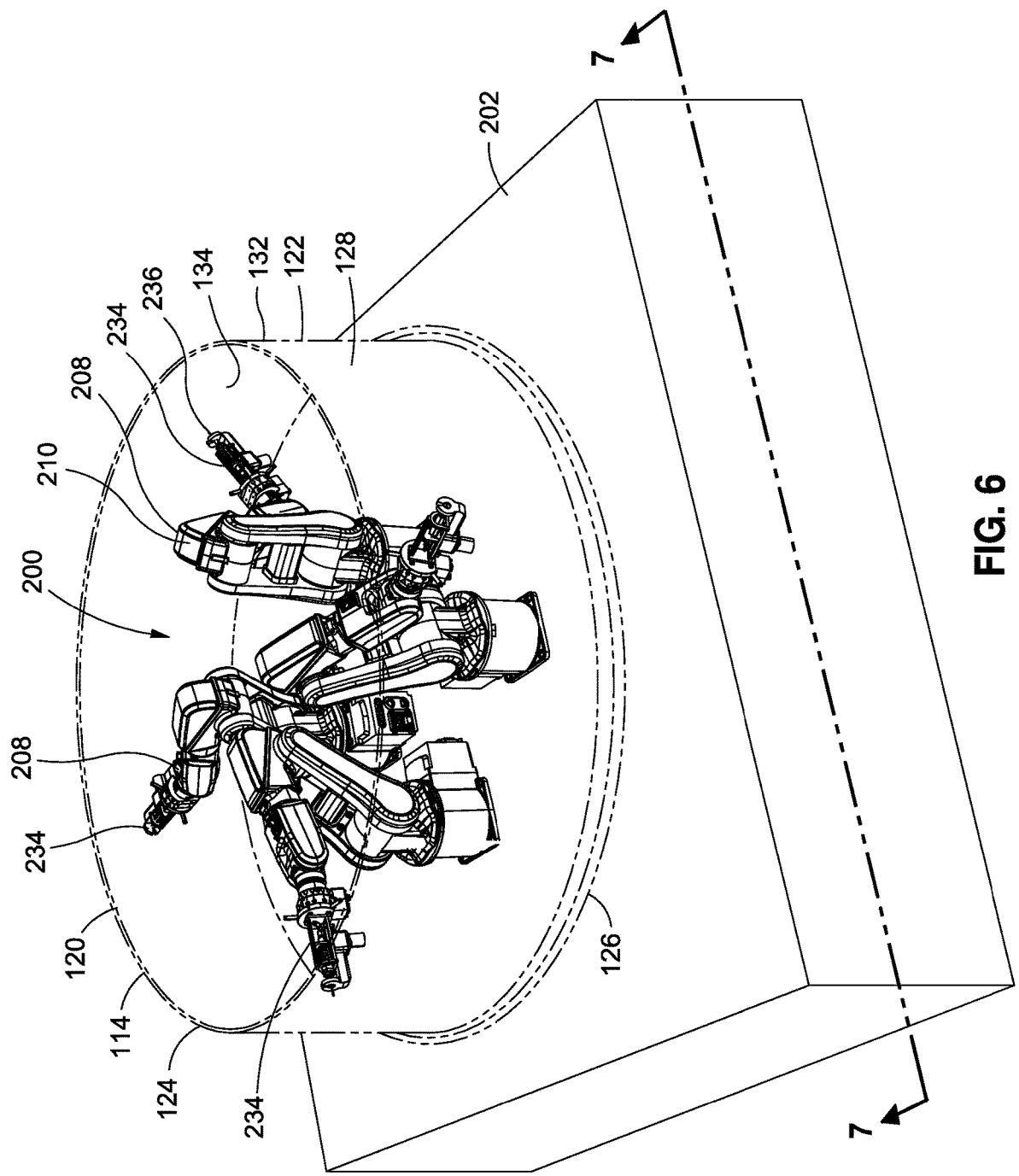
FIG. 6 is a perspective illustration of the drilling system with the barrel section shown in phantom lines to illustrate a plurality of robotic drilling units of the drilling system.
Figure 7:
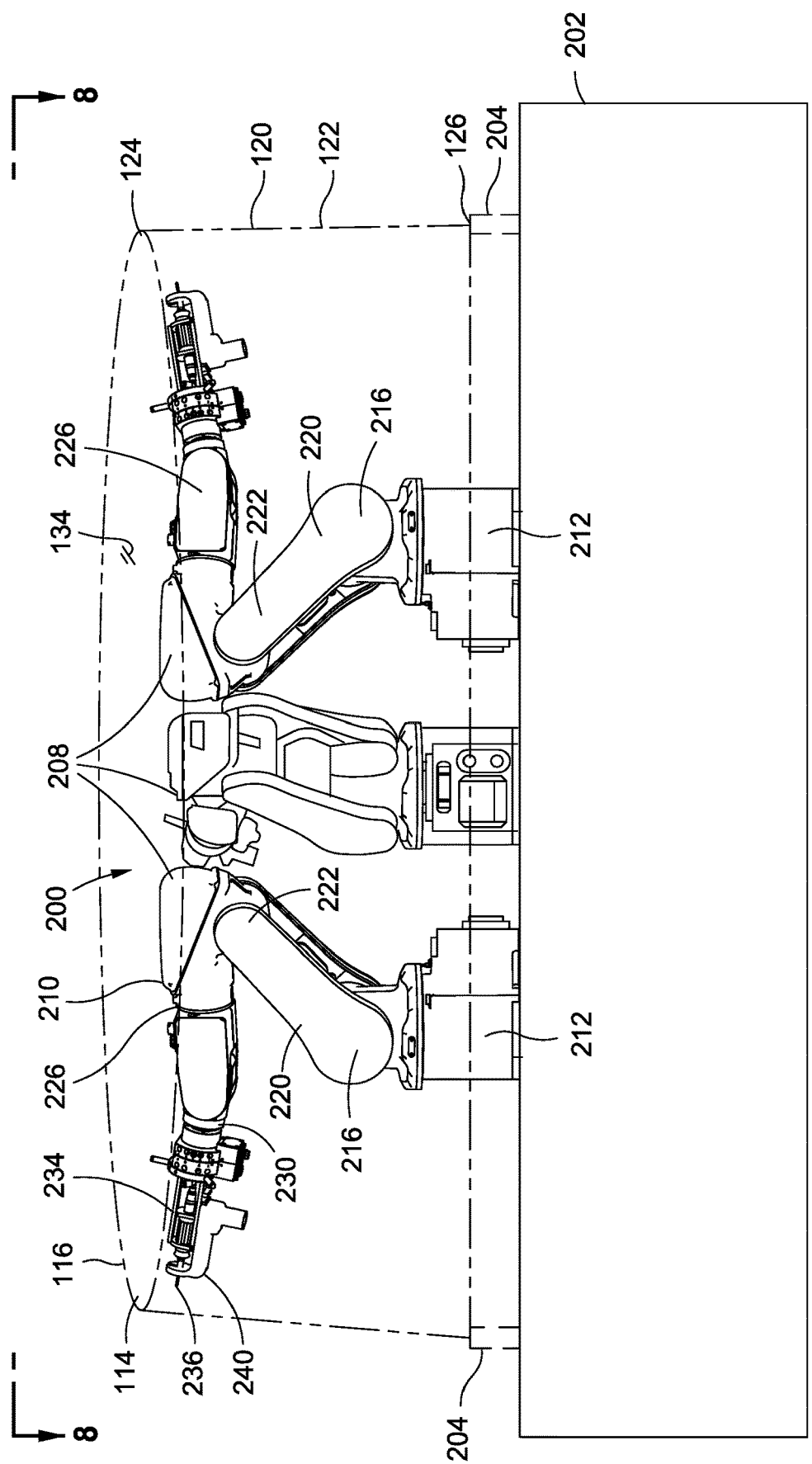
FIG. 7 is a side view of the drilling system.

FIG. 6 is a perspective illustration of the plurality of robotic drilling units 208 positioned on the system base 202 and mounted within relatively close proximity to one another such that the barrel section 120 circumscribes the plurality of robotic drilling units 208 when the barrel section 120 is mounted to the system base 202. Although four (4) robotic drilling units 208 are shown, any number may be provided. In an embodiment, the robotic drilling units 208 may be mounted in an array. For example, each one of the robotic drilling units 208 may include a drilling unit base 212 (FIG. 7). The drilling unit bases 212 (FIG. 7) may be mounted to the system base 202 in a circular array 206 (FIG. 8) such that when the barrel section 120 is mounted to the system base 202, each one of the drilling unit bases 212 (FIG. 7) is positioned at substantially the same distance from the inner face sheet 134 of the barrel section 120.

FIG. 7 is a side view of an embodiment of the drilling system 200. The barrel section 120, shown in phantom lines, may be supported on one fixture 204 or multiple fixtures 204. The fixtures 204 may comprise spacers sized and configured to position the barrel section 120 at a vertical location that is complementary to the movement capability of the drill end effectors 234 of the robotic drilling units 208. In this regard, the fixtures 204 may be configured such that the drill end effectors 234 may form perforations 136 (FIG. 9) in the inner face sheet 134 of the barrel section 120 at any vertical location between the forward edge 124 of the barrel section 120 and the aft edge 126 of the barrel section 120. The fixtures 204 may be comprised of a rigid material and may be configured as simple blocks (not shown) formed of metallic or polymeric material and which may be fixedly coupled to the system base 202. The fixtures 204 may extend vertically along any portion of the height of the barrel section and horizontally along any portion of the circumference of the barrel section 120.

Figure 8:
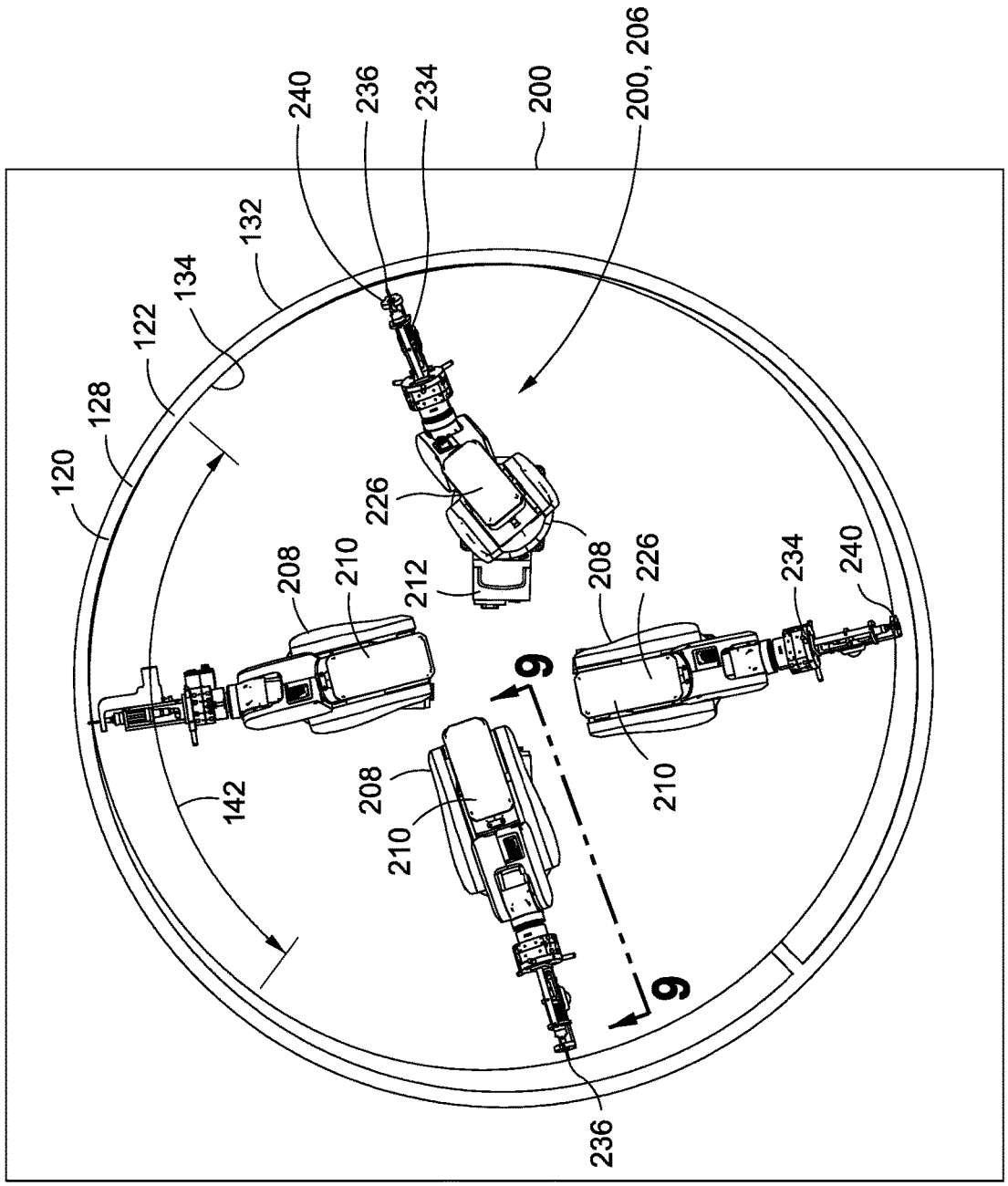
FIG. 8 is the top view of the drilling system.

FIG. 8 is a top view of the drilling system 200 illustrating an arrangement of the robotic drilling units 208. Each one of the robotic drilling units 208 may include a robotic arm assembly 210 having a drill end effector 234 mounted on an end of the robotic arm assembly 210. The robotic drilling units 208 may be mounted such that drilling unit bases 212 are positioned adjacent to a center of the array of the robotic drilling units 208. In an embodiment, the drilling system 200 may comprise a single robotic drilling unit 208 or a plurality of robotic drilling units 208. For example, the drilling system 200 may include two (2) or more robotic drilling units 208 having drilling unit bases 212 which may be arranged at a predetermined spacing relative to one another, such as a substantially equiangular spacing relative to one another.

Referring still to FIG. 8, the plurality of robotic drilling units 208 may be configured (e.g., programmed) to drill perforations 136 (FIG. 9) within substantially equivalent arc segments 142 of the barrel section 120. For example, for the embodiment shown, the plurality of robotic drilling units 208 may comprise four (4) robotic drilling units 208. The drilling unit bases 212 may be arranged such that the drilling unit bases 212 are positioned at an angular spacing of approximately ninety degrees relative to one another. In an embodiment, each one of the robotic drilling units 208 may be configured to drill perforations 136 (FIG. 9) within an approximate ninety-degree arc segment 142 of the barrel section 120. However, the robotic drilling units 208 may be positioned at any location relative to one another and may be configured to form perforations 136 (FIG. 9) at any circumstantial location or any vertical location of the barrel section 120.

In FIG. 8, the drill end effector 234 of each one of the robotic drilling units 208 may be oriented generally radially outwardly away from the drilling unit base 212. The drilling unit bases 212 may be positioned to provide space for movement of the robotic arm assemblies 210 during operation of the drilling system 200. In this regard, the robotic drilling units 208 are simultaneously operable in synchronized movement with one another in a manner allowing the drill end effectors 234 to simultaneously drill a plurality of perforations 136 (FIG. 9) in the barrel section 120. The robotic drilling units 208 may be programmed to avoid collisions with one another and with the barrel section 120 during the synchronized movement with one another.

Figure 9:
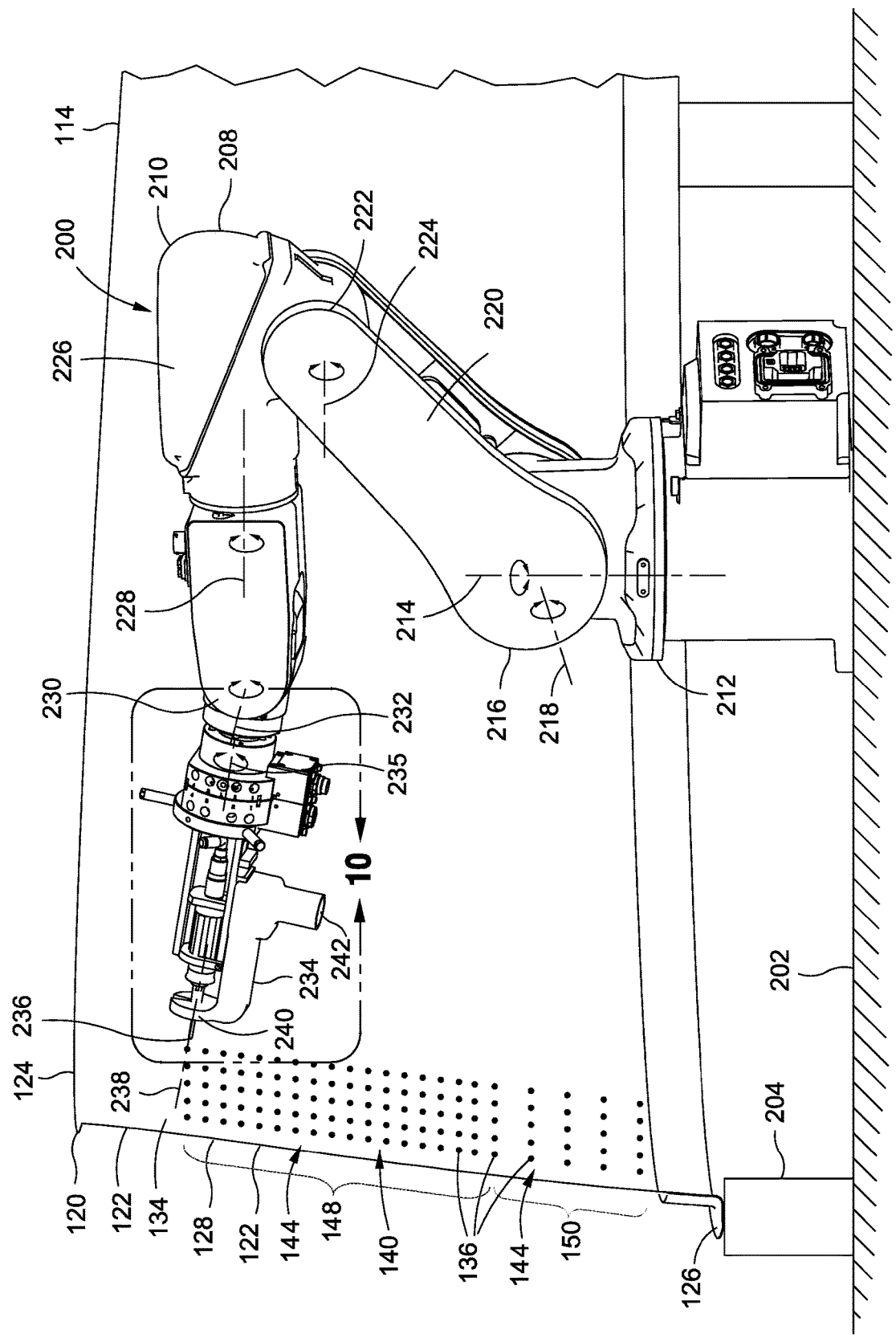
FIG. 9 is a side view of one of the robotic drilling units forming a hole pattern along an inner face sheet of the inner barrel section.

FIG. 9 is a side view of one of the robotic drilling units 208 showing the barrel section 120 supported on fixtures 204 and illustrating a drill bit 236 of one of the drill end effectors 234 forming perforations 136 in a predetermined hole pattern 140 along the inner face sheet 134 of the inner barrel section 120. In this regard, in an embodiment, each one of the robotic drilling units 208 may be indexed to the system base 202. The barrel section 120 may also be indexed to the system base 202 such as with fixtures 204 to provide a means for the drill end effector 234 to form perforations 136 within a relatively small positional tolerance relative to a circumferential direction (not shown) of the barrel section 120 and relative to an axial direction (not shown) of the barrel section 120. However, the barrel section 120 and the robotic drilling units 208 may be indexed relative to one another by other means, and are not necessarily limited to being indexed to the system base 202.

In FIG. 9, the robotic drilling units 208 may be operated in a manner to drill the perforations 136 in the inner face sheet 134 such that a percent-open-area 144 in one section 148 of the inner face sheet 134 is different than the percent-open-area 144 in another section 150 of the inner face sheet 134. In this regard, the robotic drilling units 208 may be programmed to drill perforations 136 to provide a greater percent-open-area 144 in a first section 148 of the inner face sheet 134 relative to drilling perforations 136 to provide a lower percent-open-area 144 in a second section 150 of the inner face sheet 134. For example, the second section 150 with a smaller percent-open-area 144 may be located adjacent to a forward edge 124 and/or an aft edge 126 of the barrel section 120, and the first section 148 with a larger percent-open-area 144 may be located in an interior region (not shown) of the inner barrel section 120 between the forward edge 124 and the aft edge 126. However, the robotic drilling 208 units may drill the perforations 136 such that the percent-open-area 144 in the inner face sheet 134 is different at different circumferential sections (not shown) of the barrel section 120, or the percent-open-area 144 of the inner barrel section 120 may vary in a different manner than the above-noted embodiments.

In FIG. 9, one or more of the robotic drilling units 208 may have a six-axis robotic arm assembly 210 which may allow for accurately positioning the drill end effector 234 at any desired location and orientation along the inner face sheet 134. As the drill end effector 234 is positioned and oriented at a desired location of a perforation 136, the drill end effector 234 may be moved axially to drive the rotating drill bit 236 into the inner face sheet 134 to form a perforation 136. Alternatively, the drill end effector 234 may be positioned at a desired location of a perforation 136 on the inner face sheet 134, and the drill end effector 234 may axially drive the rotating drill bit 236 along a direction of the drill bit axis 238 to drill the perforation 136 in the inner face sheet 134. In an embodiment, the six-axis robotic arm assembly 210 may include a first arm 220 which may be attached to the drilling unit base 212 at a shoulder joint 216. The first arm 220 may be attached to a second arm 226 at an elbow joint 222. The second arm 226 may be attached to the drill end effector 234 at a wrist joint 230.

In FIG. 9, the drilling unit base 212 may be configured to rotate about a vertical base axis 214 relative to the system base 202. The first arm 220 may be configured to rotate about a shoulder axis 218 of the shoulder joint 216 coupling the first arm 220 to the drilling unit base 212. The second arm 226 may be configured to rotate about an elbow axis 224 of the elbow joint 222 coupling the second arm 226 to the first arm 220. A portion of the second arm 226 may also be configured to swivel about a second arm axis 228 extending along a direction from the elbow joint 222 to the wrist joint 230. The drill end effector 234 may be configured to rotate about a wrist axis 232 of the wrist joint 230. In addition, the drill end effector 234 may be configured to rotate about an end effector axis 235 which may be generally parallel to the drill bit axis 238. In an optional embodiment, the end effector may be configured to linearly translate the drill bit 236 along a drill bit axis 238 such as when drilling a perforation 136 in the inner face sheet 134.

In FIG. 9, the robotic arm assembly 210 is shown in a six-axis embodiment. However, the robotic arm assembly 210 may be provided in alternative arrangements. For example, the robotic arm assembly 210 may be provided in a 3-axis embodiment (not shown), a 4-axis embodiment (not shown), or a 5-axis embodiment (not shown). In addition, the robotic arm assembly 210 may be provided in an embodiment having more than six (6) axes. Furthermore, the robotic arm assembly 210 may be configured as a motion control system (not shown), a rigid frame (not shown) having linear axes along which the end effector is movable, or any other type of motion control device for controlling a drill end effector 234 for drilling perforations 136. In addition, each robotic arm assembly 210 may include more than one drill end effector 234. Furthermore, each drill end effector 234 may have more than one drill bit 236 for simultaneously forming perforations 136.

Figure 10:
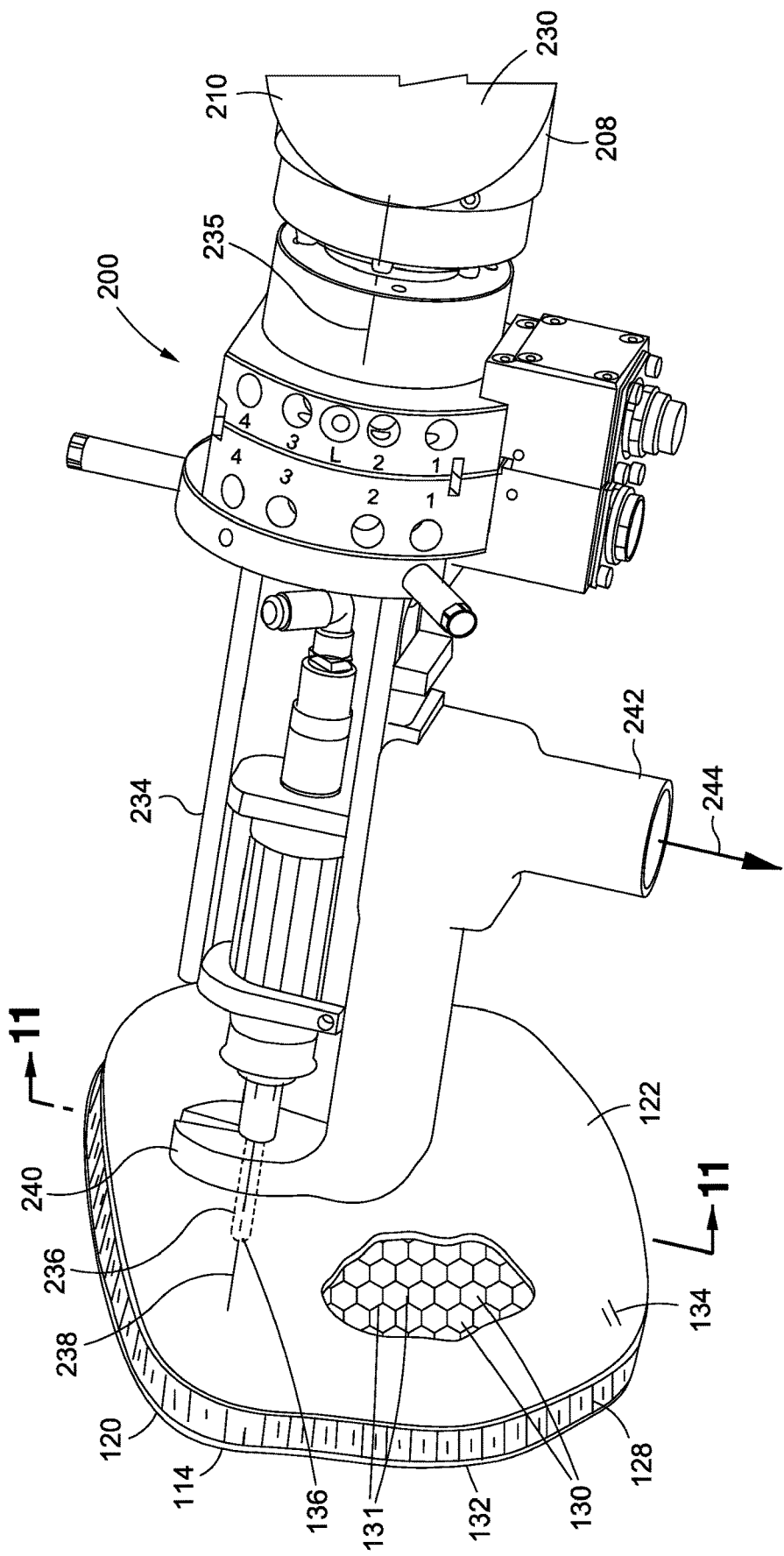
FIG. 10 is a perspective illustration of a drill end effector forming a perforation in an inner face sheet of a composite sandwich structure of the inner barrel section.

FIG. 10 shows a drill end effector 234 forming a perforation 136 in the inner face sheet 134 of a composite sandwich structure 122 of the inner barrel section 120.

Advantageously, the drilling system 200 provides a means for accurate and rapid placement of the drill end effector 234 for drilling perforations 136 in a predetermined hole pattern 140 (FIG. 9). For example, in an embodiment, each one of the drill end effectors 234 of a robotic drilling unit 208 may be configured to form up to three (3) or more perforations 136 per second, per drill end effector 234. In an embodiment, the drill end effector 234 may be provided with a drill bit 236 configured to form acoustic perforations 136 having a hole diameter of approximately 0.010 to 0.10 inch, although larger or smaller perforations 136 are possible based on the drill bit 236 diameter.

In FIG. 10, for forming perforations 136 in a composite inner face sheet 134, the drill end effector 234 may be configured to drive the drill bit 236 at a feed rate of approximately 20-60 inches per minute, and at rotational speeds of between approximately 20,000 to 40,000 rpm, although larger or smaller feed rates and larger or smaller rotational speeds may be selected based on the material being drilled and the composition of the drill bit 236. The drill bit 236 feed rate and the drill bit 236 rotational speed may be controlled to minimize drill bit 236 wear, and such that the perforations 136 may meet tight tolerances for roundness and other hole parameters. Significantly, each robotic drilling unit 208 is configured to quickly and accurately form hole patterns 140 (FIG. 9) at a relatively small center-to-center positional tolerance (i.e., perforation-to-perforation) such as a center-to-center positional tolerance of approximately 0.010 inch or less. However, the center-to-center positional tolerance may be greater than 0.010 inch, such as up to approximately 0.050 inch or greater.

In FIG. 10, one or more of the drill end effectors 234 may include a vacuum attachment 240 for removing debris (not shown) such as dust and chips that may be generated during the drilling of the perforations 136. The vacuum attachment 240 may have a hollow (not shown) or open portion (not shown) that may be positioned around the drill bit 236 and may be placed adjacent to or in contact with the inner face sheet 134 when the drill bit 236 contacts the inner face sheet 134 and drills a perforation 136. The vacuum attachment 240 may include a vacuum port 242 for connection to a vacuum source (not shown) using a vacuum hose (not shown) for drawing a vacuum 244 on the vacuum attachment 240 for drawing debris (not shown) from the area surrounding the perforation 136.

In FIG. 10, in a further embodiment, the drilling system 200 may be provided with an automated bit changer (not shown) for changing the drill bits 236 using robotic control. In this manner, worn drill bits 236 may be replaced after drilling a predetermined quantity of perforations 136. For example, an automated bit changer (not shown) may replace each drill bit 236 after drilling anywhere from approximately 1,000 to 30,000 perforations 136, although the drill bits 236 may be replaced after drilling a smaller or larger quantity of perforations 136 than the above-noted range. Depending upon the size (e.g., diameter and height) of the inner barrel section 120 and the total quantity of robotic drilling units 208 that are used, each drill end effector 234 may undergo 1 to 20 or more drill bit changes per barrel section 120.

Referring briefly to FIG. 9, in an embodiment, the drill end effectors 234 may be controlled to drill perforations 136 in a hole pattern 140 of vertical rows (not shown) along a height of the barrel section 120. In this regard, each drill end effector 234 may drill a vertical row of perforations 136, and the drill end effector 234 may be rotated about the vertical base axis 214 to allow the drill end effector 234 to drill another vertical row of perforations 136 adjacent to the previously-drilled vertical row of perforations 136. The drill end effectors 234 may also be controlled to drill perforations 136 in horizontal rows (not shown), or in any other direction or combination of directions. As indicated above, the robotic arm assemblies 210 may be operated in a synchronized manner such that the drill end effectors 234 are maintained at a generally equiangular spacing from one another during the simultaneous drilling of perforations 136 in the inner face sheet 134 of the barrel section 120. For example, for a drilling system 200 having four (4) robotic drilling units 208, the drill end effectors 234 may be maintained at an angular separation of approximately ninety (90) degrees from each other during the simultaneous drilling of perforations 136 in the inner face sheet 134.

Figure 11:
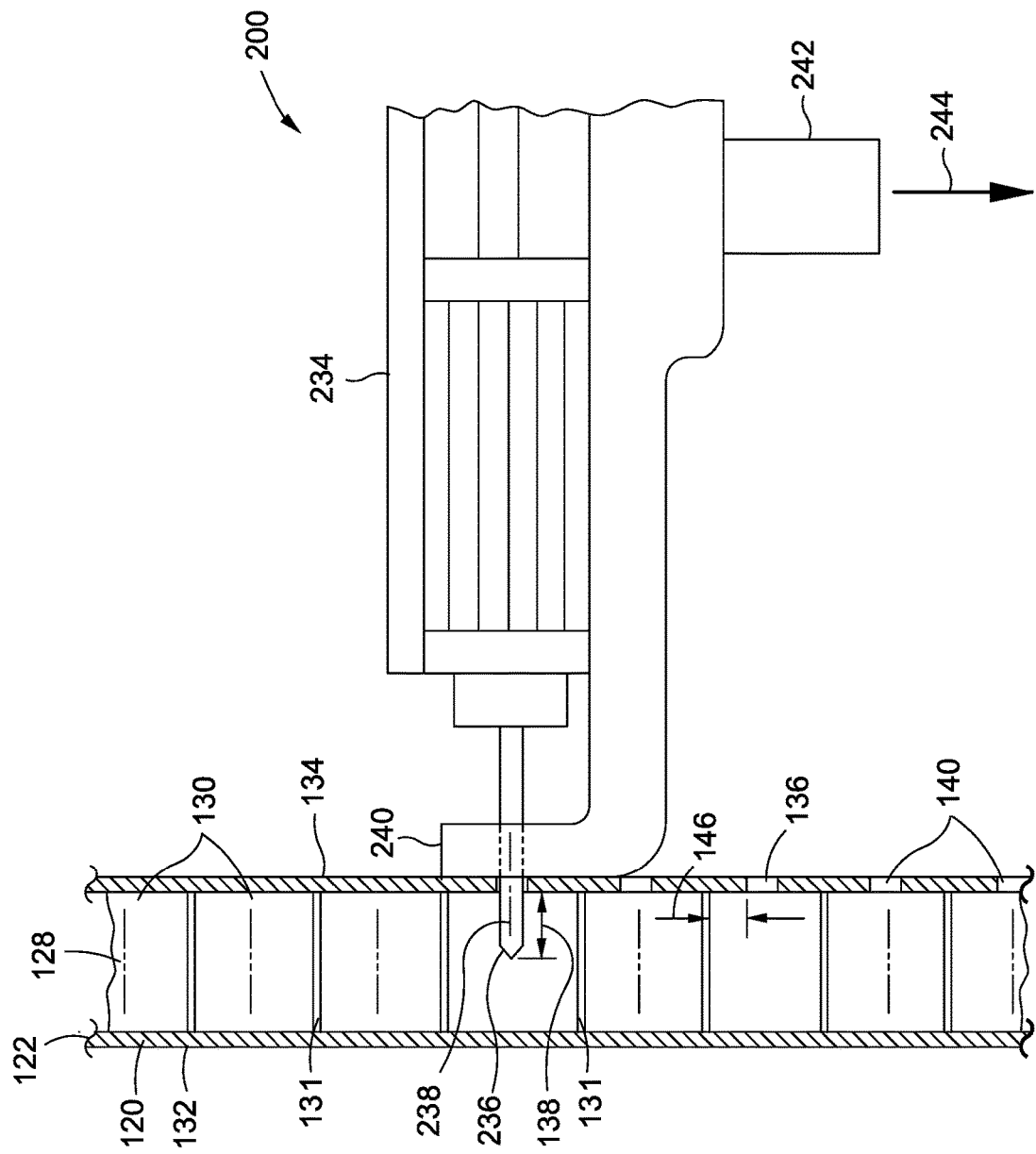
FIG. 11 is a cross sectional illustration taken along line 11 of FIG. 10 and illustrating a drill bit of the drill end effector drilling a perforation in the inner face sheet of the composite sandwich structure.

FIG. 11 is a cross sectional view of a drill bit 236 of the drill end effector 234 forming a perforation 136 in the inner face sheet 134 of a composite sandwich structure 122. In an embodiment, the drill end effector 234 may include a drill stop (not shown) to control a depth 138 at which the drill bit 236 extends into the composite sandwich structure 122, and minimize the depth 138 of the drill bit 236 into the core 128 material. Furthermore, a drill stop (not shown) may stabilize the drill end effector 234 when drilling the perforation 136 to prevent lateral movement of the drill bit 236 relative to the perforation 136, and which may advantageously avoid a non-conformance regarding the positional tolerance, roundness tolerance, or other tolerance parameters of the perforation 136. In an embodiment, each drill end effector 234 may include a non-contact method of gauging the depth 138 at which each perforation 136 is drilled such as by using a laser device (not shown), an ultrasonic device (not shown), and other non-contact device. The depth 138 of drilling may also be controlled by a controller (not shown) controlling the drill end effector 234.

Figure 12:
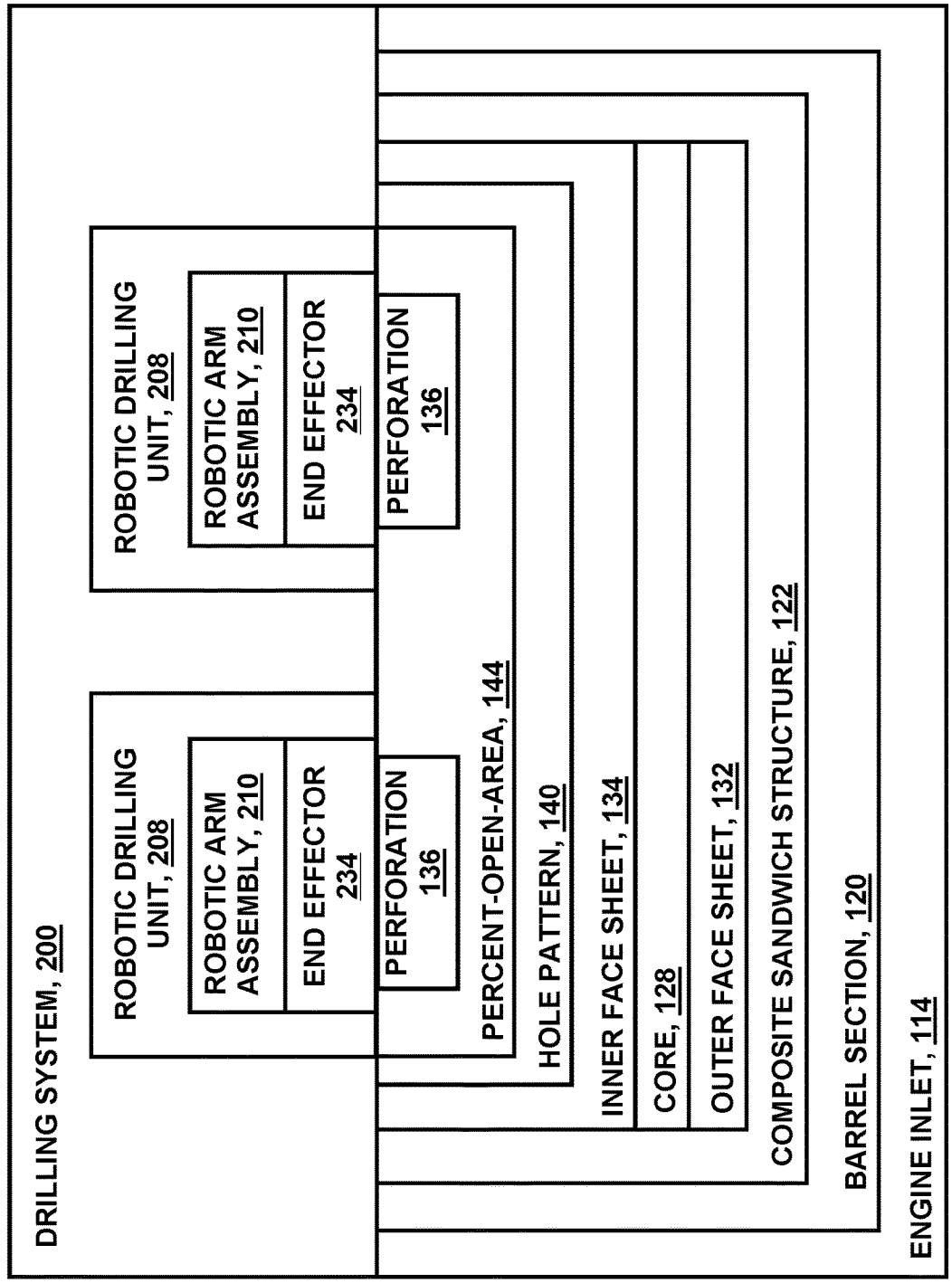
FIG. 12 is a block diagram of an embodiment of the drilling system.

FIG. 12 is a block diagram of an embodiment of a drilling system 200. The drilling system 200 may include a plurality of robotic drilling units 208. Each one of the robotic drilling units 208 may include a robotic arm assembly 210 as described above. A drill end effector 234 may be coupled to the end of each one of the robotic arm assemblies 210 of each robotic drilling unit 208. The robotic drilling units 208 may be simultaneously operable in synchronized movement with one another such that the drill end effectors 234 may simultaneously drill a plurality of perforations 136 in the barrel section 120.

In FIG. 12, the barrel section 120 may comprise an inner barrel section 120 of an engine inlet 114 such as of a gas turbine engine 108 (FIG. 3), as indicated above. In an embodiment, the barrel section 120 may be formed as a composite sandwich structure 122. The composite sandwich structure 122 may have an outer face sheet 132, a core 128, and an inner face sheet 134 which may be assembled or bonded together to form a one-piece engine inlet inner barrel section 120. The drilling system 200 may rapidly and accurately form a plurality of perforations 136 in a predetermined hole pattern of perforations 136 (FIG. 9) in the inner face sheet 134 to provide a predetermined percent-open-area 144 for the inner barrel section 120 to meet acoustic performance requirements.

Figure 13:
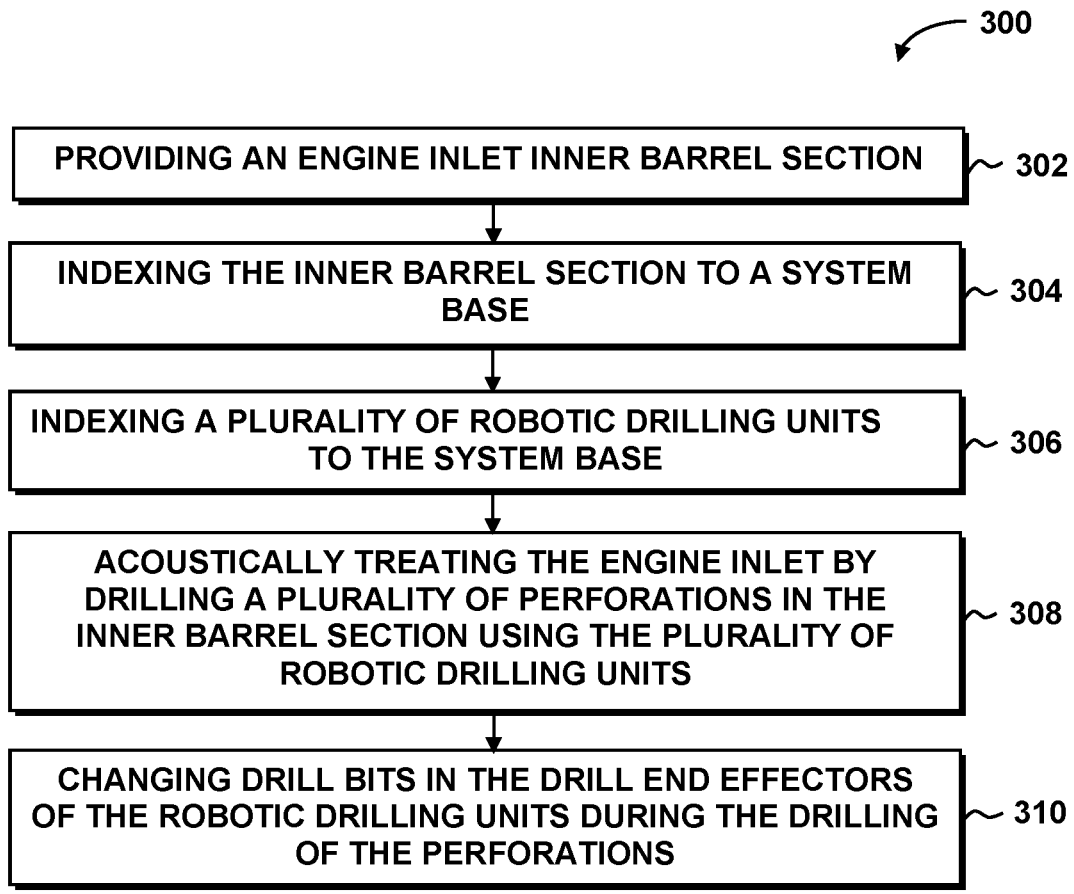
FIG. 13 is an illustration of a flow chart including one or more operations that may be implemented in a method of fabricating an engine inlet.

FIG. 13 is an illustration of a flow chart including one or more operations that may be included in a method 300 of fabricating an engine inlet 114 (FIG. 3). Step 302 of the method may include providing a barrel section 120 (FIG. 3) such as an inner barrel section 120 (FIG. 3) of an engine inlet 114 (FIG. 3). As indicated above, the inner barrel section 120 (FIG. 3) may be provided as a one-piece composite sandwich structure 122 (FIG. 3). In such a composite sandwich structure 122 (FIG. 3), the inner face sheet 134 (FIG. 3) may be formed of composite material and the outer face sheet 132 (FIG. 3) may be formed of composite material (e.g., fiber-reinforced polymeric matrix material). However, the inner face sheet 134 (FIG. 3) and/or the outer face sheet 132 (FIG. 3) may be formed of metallic material, or a combination of metallic material and non-metallic material.

As indicated above, the core 128 (FIG. 3) may comprise honeycomb core formed of metallic material and/or non-metallic material and may include aluminum, titanium, aramid, fiberglass, or other core materials. The engine inlet 114 (FIG. 3) inner barrel section 120 (FIG. 3) may be fabricated as a one-piece composite sandwich structure 122 (FIG. 3) formed in a single-stage cure. As described above, the barrel section 120 (FIG. 3) may be provided in a single-stage cure wherein the inner face sheet 134 (FIG. 3), the core 128 (FIG. 3), and the outer face sheet 132 (FIG. 3) may be laid up on a layup mandrel, after which heat and/or pressure may be applied to the layup (not shown) for a predetermined time for curing in a single stage.

Step 304 of the method 300 of FIG. 13 may include mounting and indexing the inner barrel section 120 (FIG. 7) to a system base 202 (FIG. 7). In this regard, the inner barrel section 120 (FIG. 7) may be supported on a plurality of fixtures 204 (FIG. 7) which may be mounted to the system base 202 (FIG. 7). The fixtures 204 (FIG. 7) may fixedly position the inner barrel section 120 (FIG. 7) on the system base 202 (FIG. 7) which may comprise a table (not shown), an assembly (not shown), or other relatively rigid structure configured to support the inner barrel section 120 (FIG. 7) and prevent movement thereof during the drilling of the perforations 136 (FIG. 9) in the inner barrel section 120 (FIG. 7).

As indicated above, the fixtures 204 may be positioned at spaced intervals around a perimeter (not shown) of the inner barrel section 120 such as along the aft edge 126 (FIG. 9) or forward edge 124 (FIG. 9) of the inner barrel section 120. The fixtures 204 may include mechanical indexing features (not shown) to index the inner barrel section 120 to the fixtures 204. A laser system (not shown) may be implemented to aid in positioning the inner barrel section 120 relative to the fixtures 204. The inner barrel section 120 may be mechanically coupled to the fixtures 204 to rigidly clamp the inner barrel section 120 in position.

Step 306 of the method 300 of FIG. 13 may include indexing the plurality of robotic drilling units to the system base 202 (FIG. 7) as shown in FIG. 7. In an embodiment, each one of the plurality of robotic drilling units 208 (FIG. 7) may have a drilling unit base 212 (FIG. 7) that may be directly mounted to the system base 202 and indexed to the system base 202 and/or to the fixtures 204 (FIG. 7) supporting the inner barrel section 120 (FIG. 7). For example, the drilling unit bases 212 of the robotic drilling units 208 may be mounted to the system base 202 and may be located inside the inner barrel section 120 as shown in FIG. 7. Alternatively, the drilling unit bases 212 may be located outside of the inner barrel section 120 and the drill end effectors 234 (FIG. 7) of the robotic arm assemblies 210 (FIG. 7) may extend inside the inner barrel section 120 to drill the perforations 136 (FIG. 9). In a further embodiment, the robotic drilling units 208 may be supported by a structure (not shown) that is located separate from the system base 202 and separate from the barrel section 120. For example, the drilling unit bases 212 of the robotic drilling units 208 may be mounted to an overhead fixture (not shown) that may be indexed to the system base 202 and/or to the fixtures 204 supporting the inner barrel section 120. The drill end effectors 234 may extend inside the barrel section 120 to drill the perforations 136.

Step 308 of the method 300 of FIG. 13 may include acoustically treating the engine inlet 114 (FIG. 9) by robotically drilling a plurality of perforations 136 (FIG. 9) into the inner face sheet 134 (FIG. 9) of the composite sandwich structure 122 (FIG. 9) engine inlet 114 inner barrel section 120 (FIG. 9) such as after final cure of the composite sandwich structure 122. For example, the method 300 may include robotically drilling the plurality of perforations 136 in the inner barrel section 120 using a plurality of the robotic drilling units 208 (FIG. 9). The method 300 may include simultaneously drilling the plurality of perforations 136 in the inner face sheet 134 using the drill end effectors 234 (FIG. 9) to provide a predetermined percent-open-area 144 of the inner face sheet 134. In an embodiment, each one of the robotic drilling units 208 may include a robotic arm assembly 210 (FIG. 9) configured as a three-axis, four-axis, five-axis, or six-axis arm assembly respectively having three axes, four axe, five axes, and six axes. The robotic arm assemblies 210 may be programmed to move the drill end effectors 234 in a synchronized manner relative to one another to drill the perforations 136 at a relatively rapid rate. For example, each one of the drill end effectors 234 may be configured to form 2-3 or more perforations 136 per second.

The method 300 (FIG. 13) may include drilling the perforations 136 (FIG. 9) in a predetermined hole pattern 140 (FIG. 9) in the engine inlet 114 (FIG. 9) inner barrel section 120 (FIG. 9) which may have a honeycomb core 128 (FIG. 11). The robotic drilling units 208 (FIG. 9) may be configured to control the drill end effectors 234 (FIG. 9) to drill the perforations 136 normal (e.g., perpendicular) to the inner face sheet 134 (FIG. 10). In addition, the robotic drilling units 208 may be configured to drill the perforations 136 at a spaced distance to the cell walls 131 (FIG. 11) of the honeycomb core 128. In this regard, the robotic drilling units 208 may be configured to drill one or more perforations 136 in each of the cells 130 at a distance from the cell walls 131 to avoid drilling into the cell walls 131. The robotic drilling units 208 may drill the perforations 136 in a hole pattern 140 that may be configured complementary to the geometry and size of the cells 130 of honeycomb core 128. For example, the hole pattern 140 (FIG. 9) may be such that one perforation 136 (FIG. 11) is drilled into each cell 130 (FIG. 11) such as at an approximate center (not shown) of each cell 130. However, the hole pattern 140 may be such that two or more perforations 136 may be drilled into each cell 130 of the honeycomb core 128 (FIG. 11).

The robotic drilling units 208 (FIG. 9) may be configured to index or position the hole pattern 140 (FIG. 9) relative to the cell 130 (FIG. 11) centers (not shown) or relative to internal structure such as the cell walls 131 (FIG. 11) of a honeycomb core 128, and which internal structure (e.g., cell walls 131) may be oriented perpendicular to the inner surface (e.g., inner face sheet 134) of the barrel section 120, as shown in FIG. 11. For example, for a honeycomb core 128 having a generally uniform arrangement of cells 130 of equal size and shape, the robotic drilling units 208 may be configured to establish a location of one of the cell walls 131 in order to index a hole pattern 140 relative to the locations of the cell 130 of the honeycomb core 128. After establishing the location of one or more cell walls 131, the robotic drilling units 208 may be configured to drill the hole pattern 140 of perforations 136 in the inner face sheet 134 of the honeycomb core 128 such that each perforation 136 is drilled at a predetermined location in each cell 130 such as at a center (not shown) of each cell 130, or at a predetermined location or spaced distance 146 relative to the cell walls 131 of each cell 130. The hole pattern 140 may also be such that multiple perforations 136 may be drilled into each cell 130 and may be located at predetermined distances or spaced distances 146 from the cell walls 131 of each cell 130.

Advantageously, the robotic drilling units 208 (FIG. 9) may be configured to form perforations 136 (FIG. 9) within a relatively high positional tolerance (e.g., 0.010 inch on centers) in the hole-to-hole spacing. In addition, as indicated above, each one of the drill end effectors 234 (FIG. 10) may include a vacuum attachment 240 (FIG. 10) configured to be positioned adjacent to or against the inner face sheet 134 during the drilling of the perforations 136. The vacuum attachment 240 may include a vacuum port 242 (FIG. 11) that may be coupled to a vacuum source (not shown) via a vacuum hose (not shown) to provide a vacuum 244 (FIG. 10) for suctioning dust, chips, and other debris away from a location where a perforation 136 is being drilled.

Step 310 of the method 300 of FIG. 13 may include periodically changing the drill bits 236 (FIG. 10) of the drill end effectors 234 (FIG. 10) during the process of drilling perforations 136 (FIG. 10) in the inner barrel section 120 (FIG. 10). In an embodiment, the method may include robotically changing the drill bits 236 using an automated bit changer (not shown). Drill bits 236 may be replaced after drilling a predetermined quantity of perforations 136. For example, each drill bit 236 may be replaced after drilling several thousand or more perforations 136. The frequency at which the drill bits 236 may be replaced may be affected by the thickness of the inner face sheet 134 (FIG. 11), the material composition of the inner face sheet 134, the rotational speed of the drill bit 236, the feed rate of the drill bit 236, the material composition of the drill bit 236, and other factors. In an embodiment not shown, the method may include detecting when a drill bit 236 is becoming dull, at which point the method may include replacing the dull drill bit 236 with a new or sharpened drill bit (not shown).

Advantageously, the drilling system 200 (FIG. 12) and method disclosed herein provides for operating a plurality of robotic drilling units 208 (FIG. 12) in a synchronized manner to accurately and rapidly form perforations 136 (FIG. 12) in the inner face sheet 134 (FIG. 12) of an inner barrel section 120 (FIG. 12) with a high degree of repeatability. In addition, the drilling system 200 provides a means for forming perforations 136 with a significant reduction in defects and rework commonly associated with conventional methods. In this regard, the drilling system 200 and method disclosed herein may avoid the above-mentioned defects of missing perforations (not shown) and/or blocked perforations (not shown) during subsequent processing in a multi-stage barrel section fabrication process (not shown), and the associated reduction in percent-open-area 144 (FIG. 9) in the inner face sheet 134 of the inner barrel section 120.

As indicated above, the percent-open-area 144 (FIG. 9) of the inner face sheet 134 is the total area of the perforations 136 (FIG. 9) as a percentage of the surface area (not shown) of the inner face sheet 134 (FIG. 9) and is a characteristic for measuring the overall effectiveness or acoustic-attenuating capability of the inner barrel section 120 (FIG. 9). In FIG. 9, the robotic drilling units 208 (FIG. 9) may be operated in a manner to drill perforations 136 to provide a percent-open-area 144 (FIG. 9) in one section 148 (FIG. 9) of the inner face sheet 134 that is different than the percent-open-area 144 in another section 150 (FIG. 9) of the face sheet 134. For example, in FIG. 9, a first section 148 of perforations 136 drilled in the inner face sheet 134 may have a larger percent-open-area 144 relative to a second section 150 of perforations 136 which may be located adjacent to a forward edge 124 and/or an aft edge 126 of the barrel section 120. However, as indicated above, differing sections (not shown) of percent-open-area 144 may be arranged in any manner along the inner face sheet 134 of the inner barrel section 120 (FIG. 9), and are not limited to the arrangement shown in FIG. 9 or described above.

Figure 14:
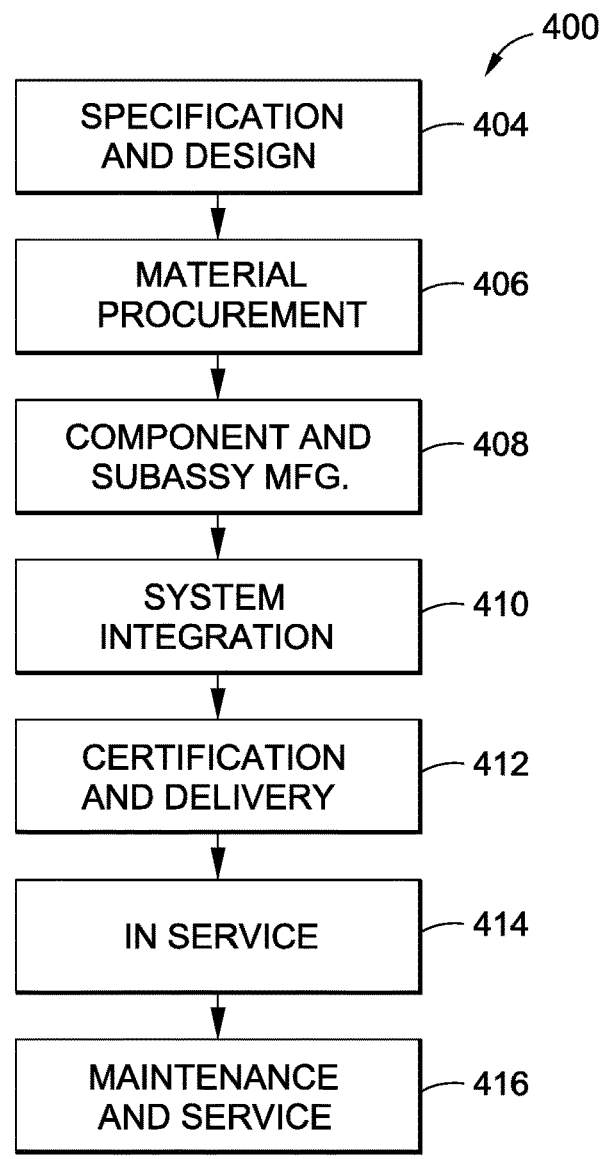
FIG. 14 is a flow diagram of an aircraft manufacturing and service methodology.
Figure 15:
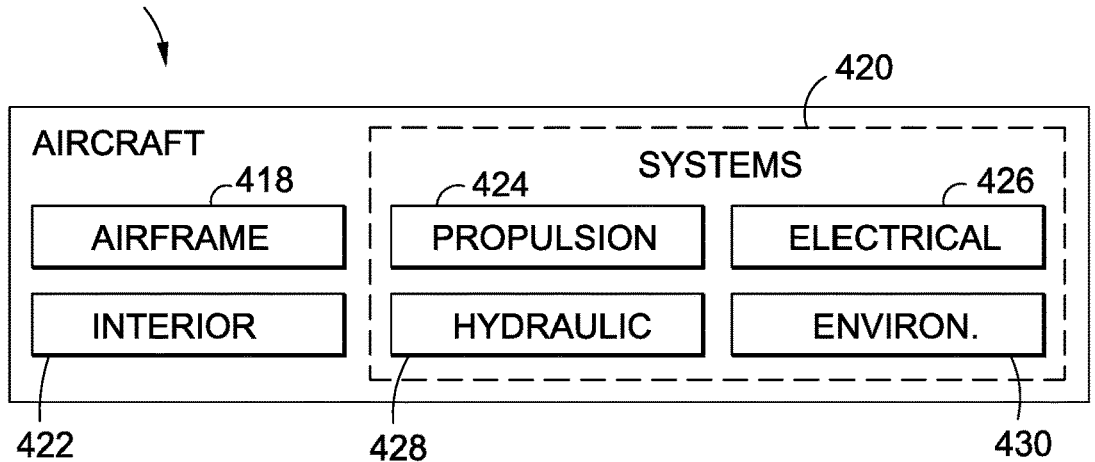
FIG. 15 is a block diagram of an aircraft.

Referring to FIGS. 14-15, embodiments of the disclosure may be described in the context of an aircraft manufacturing and service method 400 as shown in FIG. 14 and an aircraft 402 as shown in FIG. 15. During pre-production, exemplary method 400 may include specification and design 404 of the aircraft 402 and material procurement 406. During production, component and subassembly manufacturing 408 and system integration 410 of the aircraft 402 takes place. Thereafter, the aircraft 402 may go through certification and delivery 412 in order to be placed in service 414. While in service by a customer, the aircraft 402 is scheduled for routine maintenance and service 416 (which may also include modification, reconfiguration, refurbishment, and so on).

Each of the processes of method 400 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 15, the aircraft 402 produced by exemplary method 400 may include an airframe 418 with a plurality of systems 420 and an interior 422. Examples of high-level systems 420 include one or more of a propulsion system 424, an electrical system 426, a hydraulic system 428, and an environmental system 430. Any number of other systems may be included. Although an aerospace example is shown, the principles of the invention may be applied to other industries, such as the automotive industry.

Apparatus and methods embodied herein may be employed during any one or more of the stages of the production and service method 400. For example, components or subassemblies corresponding to production process 408 may be fabricated or manufactured in a manner similar to components or subassemblies produced while the aircraft 402 is in service. Also, one or more apparatus embodiments, method embodiments, or a combination thereof may be utilized during the production stages 408 and 410, for example, by substantially expediting assembly of or reducing the cost of an aircraft 402. Similarly, one or more of apparatus embodiments, method embodiments, or a combination thereof may be utilized while the aircraft 402 is in service, for example and without limitation, to maintenance and service 416.

Many modifications and other embodiments of the disclosure will come to mind to one skilled in the art to which this disclosure pertains having the benefit of the teachings presented in the foregoing descriptions and the associated drawings. The embodiments described herein are meant to be illustrative and are not intended to be limiting or exhaustive. Although specific terms are employed herein, they are used in a generic and descriptive sense only and not for purposes of limitation.

What is claimed is:

1. A drilling system, comprising:
a single robotic drilling unit having a drill end effector positioned inside a barrel section configured as a composite sandwich structure having an inner face sheet;
the single robotic drilling unit being operable to drill a plurality of perforations into the inner face sheet using the drill end effector;
the single robotic drilling unit is configured to index a hole pattern of the perforations to one or more cell walls of a honeycomb core of the composite sandwich structure; and
the single robotic drilling unit is configured to form the hole pattern in the inner face sheet such that the perforations are located at a spaced distance from the cell walls of the honeycomb core.

2. The drilling system of claim 1, wherein:
the drill end effector is positioned inside a one-piece engine inlet inner barrel section cured in a single stage.

3. The drilling system of claim 1, wherein:
the single robotic drilling unit is operated in a manner to drill the perforations such that a percent-open-area in one section of the inner face sheet is different than the percent-open-area in another section of the inner face sheet.

4. The drilling system of claim 1, wherein:
the single robotic drilling unit has a robotic arm assembly being movable about at least five axes.

5. The drilling system of claim 1, wherein:
the single robotic drilling unit has a drilling unit base positioned inside the barrel section.

6. A method of fabricating an engine inlet, comprising the steps of:
providing an engine inlet inner barrel section configured as a composite sandwich structure having an inner face sheet;
drilling, using a drill end effector of a single robotic drilling unit in which the drill end effector is positioned inside the barrel section, a plurality of perforations in the inner face sheet after final cure of the composite sandwich structure, wherein the drilling comprises indexing a hole pattern of the perforations to one or more cell walls of a honeycomb core of the composite sandwich structure, and positioning the hole pattern such that each perforation is located at a spaced distance from the cell walls; and
forming the plurality of perforations in a quantity providing a predetermined percent-open-area of the inner face sheet.

7. The method of claim 6, wherein the step of providing the engine inlet inner barrel section comprises:
providing the engine inlet inner barrel section as a one-piece composite sandwich structure.

8. The method of claim 6, wherein the step of drilling the plurality of perforations comprises:
drilling the perforations to provide a percent-open-area in one section of the inner face sheet that is different than the percent-open-area in another section of the inner face sheet.

9. The method of claim 6, further comprising:
positioning a drilling unit base of the single robotic drilling unit inside the engine inlet inner barrel section prior to drilling the plurality of perforations.

10. The method of claim 6, further comprising:
indexing the engine inlet inner barrel section and the single robotic drilling unit to at least one fixture supporting the barrel section prior to drilling the plurality of perforations.

11. A drilling system, comprising:
a single robotic drilling unit having a drill end effector positionable inside a barrel structure supported on a system base;
the single robotic drilling unit being operable to drill a hole pattern of perforations into an inner surface of the barrel structure using the drill end effector; and
the single robotic drilling unit is configured to index the perforations relative to internal structure of the barrel structure such that all of the perforations are at a spaced distance relative to the internal structure, the internal structure being oriented perpendicular to the inner surface and located on a side of the inner surface opposite the single robotic drilling unit.

12. The drilling system of claim 11, wherein:
the drill end effector is controlled to drill the perforations in a vertical row along a height of the barrel structure and/or in a horizontal row along a circumference of the barrel structure.

13. The drilling system of claim 12, wherein:
the single robotic drilling unit has a vertical base axis; and
the drill end effector is rotatable about the vertical base axis to allow the drill end effector to drill another vertical row of perforations adjacent to a previously-drilled vertical row of perforations.

14. The drilling system of claim 11, wherein:
the single robotic drilling unit is suspended over the barrel structure by an overhead fixture during drilling of the perforations.

15. The drilling system of claim 11, wherein:
the barrel structure comprises multiple segments assembled together to form a closed shape.

16. A method of drilling perforations in a barrel structure, comprising the steps of:
supporting a barrel structure on a system base;
drilling, using a robotic drilling unit having a drill end effector positionable inside the barrel structure, a hole pattern of perforations into an inner surface of the barrel structure using the drill end effector; and
indexing, using the robotic drilling unit, the perforations relative to internal structure of the barrel structure such that all of the perforations are at a spaced distance relative to the internal structure, the internal structure being oriented perpendicular to the inner surface and located on a side of the inner surface opposite the robotic drilling unit.

17. The method of claim 16, wherein the step of drilling the hole pattern of perforations comprises:
drilling, using the drill end effector, the perforations in a vertical row along a height of the barrel structure and/or in a horizontal row along a circumference of the barrel structure.

18. The method of claim 17, wherein the step of drilling the hole pattern of perforations comprises:
rotating the drill end effector about vertical base axis of the robotic drilling unit to drill another vertical row of perforations adjacent to a previously-drilled vertical row of perforations.

19. The method of claim 16, wherein the step of drilling the hole pattern of perforations comprises:

suspending the robotic drilling unit over the barrel structure by an overhead fixture when drilling the perforations.

20. The method of claim 16, further comprising:
positioning a drilling unit base of the robotic drilling unit inside the barrel structure prior to drilling the hole pattern of perforations.

21. The drilling system of claim 1, wherein:
the drill end effector has a vacuum attachment for removing debris generated during the drilling of the perforations.

22. The drilling system of claim 21, wherein:
the vacuum attachment is configured to be positioned against the inner face sheet during the drilling of the perforations.

23. The drilling system of claim 1, wherein:
the single robotic drilling unit is configured to form the perforations at a center-to-center positional tolerance of 0.010 inch or less.

24. The drilling system of claim 1, wherein:
the drill end effector is configured to drive a drill bit at a feed rate of 20-60 inches per minute, and at rotational speeds of between approximately 20,000 to 40,000 rpm.

25. The drilling system of claim 1, wherein:
the drill end effector is controlled to drill the perforations in a vertical row along a height of the barrel structure and/or in a horizontal row along a circumference of the barrel section.

26. The drilling system of claim 11, wherein:
the drill end effector has a vacuum attachment for removing debris generated during the drilling of the perforations.

27. The drilling system of claim 26, wherein:
the vacuum attachment is configured to be positioned against the inner surface during the drilling of the perforations.

28. The drilling system of claim 11, wherein:
the single robotic drilling unit is operated in a manner to drill the perforations such that a percent-open-area in one section of the inner surface is different than the percent-open-area in another section of the inner surface.

29. The drilling system of claim 11, wherein:
the single robotic drilling unit has a drilling unit base positioned inside the barrel structure.

30. The drilling system of claim 11, wherein:
the single robotic drilling unit has a robotic arm assembly being movable about at least five axes.

* * * * *